(12) United States Patent
Aoki et al.

(10) Patent No.: US 10,476,415 B2
(45) Date of Patent: Nov. 12, 2019

(54) MOTOR DRIVE CONTROL DEVICE AND MOTOR DRIVE CONTROL METHOD

(71) Applicant: MINEBEA MITSUMI Inc., Nagano (JP)

(72) Inventors: Masato Aoki, Iwata (JP); Hiroyuki Kaidu, Iwata (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/032,161

(22) Filed: Jul. 11, 2018

(65) Prior Publication Data

US 2019/0028046 A1  Jan. 24, 2019

(30) Foreign Application Priority Data

Jul. 18, 2017 (JP) .................................. 2017-139496

(51) Int. Cl.
| | |
|---|---|
| H02P 6/28 | (2016.01) |
| H02H 7/085 | (2006.01) |
| H02P 6/22 | (2006.01) |
| H02H 7/08 | (2006.01) |
| H02P 6/15 | (2016.01) |

(Continued)

(52) U.S. Cl.
CPC ............ *H02P 6/28* (2016.02); *H02H 7/0844* (2013.01); *H02H 7/0854* (2013.01); *H02P 6/15* (2016.02); *H02P 6/16* (2013.01); *H02P 6/22* (2013.01); *H02P 6/24* (2013.01)

(58) Field of Classification Search
CPC ...... H02P 6/12; H02P 6/20; H02P 6/22; H02P 6/24; H02P 2209/07; H02H 7/08
See application file for complete search history.

(56) References Cited

U.S. PATENT DOCUMENTS

| 5,694,010 A | * | 12/1997 | Oomura | ............... | H02H 7/0833 |
| | | | | | 318/400.07 |
| 6,915,194 B2 | * | 7/2005 | Kodama | ................ | B62D 5/008 |
| | | | | | 180/422 |

(Continued)

FOREIGN PATENT DOCUMENTS

JP  2011-125113 A  6/2011

*Primary Examiner* — Rina I Duda
(74) *Attorney, Agent, or Firm* — Pearne & Gordon LLP

(57) ABSTRACT

According to an aspect of the present disclosure, a motor drive control device includes a motor drive unit having a plurality of switch elements connected to a power supply source and supplying a driving current to a plurality of phase coils of a motor, a control circuit unit outputting, to the motor drive unit, a drive control signal for operating the plurality of switch elements to sequentially switch energization patterns for the plurality of phase coils, and a current detecting circuit for detecting a voltage value corresponding to a magnitude of the driving current, wherein the control circuit unit includes a first determination unit determining whether a state of overcurrent where a magnitude of the driving current exceeds a predetermined overcurrent threshold occurs based on the voltage value each time an energization pattern is switched, and a second determination unit determining whether driving of the motor is in an abnormal condition based on a determination result of the first determination unit for a plurality of energization patterns.

12 Claims, 8 Drawing Sheets

(51) Int. Cl.
*H02P 6/16* (2016.01)
*H02P 6/24* (2006.01)

(56) References Cited

U.S. PATENT DOCUMENTS

| | | | | |
|---|---|---|---|---|
| 8,159,162 B2* | 4/2012 | Kanamori | ............... | H02P 6/20 318/400.11 |
| 8,305,020 B2* | 11/2012 | Suzuki | ................ | H02M 1/32 318/254.1 |
| 8,441,219 B2* | 5/2013 | Li | ........................ | H02P 5/46 318/400.02 |
| 8,779,706 B2* | 7/2014 | Tsuji | .................... | B60L 3/003 318/139 |

* cited by examiner

○ : NORMAL CURRENT VALUE
△ : ABNORMAL CURRENT VALUE
  (MORE SUDDEN CHANGE IN CURRENT THAN ENERGIZATION PATTERN MARKED WITH ○)
× : ABNORMAL CURRENT VALUE
  (MORE SUDDEN CHANGE IN CURRENT THAN ENERGIZATION PATTERN MARKED WITH △)

| COMBINATION→ (ENERGIZATION PATTERN) | | (1) | (2) | (3) | (4) | (5) | (6) |
|---|---|---|---|---|---|---|---|
| HIGH SIDE | | U | U | V | V | W | W |
| LOW SIDE | | V | W | W | U | U | V |
| FAILURE | Q1 (UH) | △ | △ | ○ | × | × | ○ |
| | Q3 (VH) | × | ○ | △ | △ | ○ | × |
| | Q5 (WH) | ○ | × | × | ○ | △ | △ |
| | Q2 (UL) | × | ○ | ○ | △ | ○ | ○ |
| | Q4 (VL) | △ | △ | × | × | × | △ |
| | Q6 (WL) | ○ | △ | △ | ○ | × | × |

FIG.7

MOTOR DRIVE CONTROL DEVICE AND MOTOR DRIVE CONTROL METHOD

CROSS REFERENCE TO RELATED APPLICATIONS

This application claims the benefit of Japanese Patent Application No. 2017-139496, filed Jul. 18, 2017, which is hereby incorporated by reference in its entirety.

BACKGROUND

Technical Field

The present disclosure relates to a motor drive control device and a motor drive control method, and, more particularly, to a motor drive control device and a motor drive control method of sequentially switching energization patterns for a plurality of phase coils.

Background

Some motor drive control devices operate a plurality of switch elements so that a driving current flows through a plurality of phase coils of a motor to drive the motor. In such motor drive control devices, when an excessive current flows through the coils due to application of an overload to the motor or the like, a motor failure may occur. To prevent this, a current limit operation of stopping an ON/OFF operation of the switch elements to temporarily stop the flow of the driving current is performed upon occurrence of an overcurrent where the driving current exceeds a predetermined magnitude.

The state of overcurrent may occur not only when the overload is applied to the motor, but also when some switch elements have failed to a state of short-circuit, for example. Even if the above-described current limit operation is performed when the state of overcurrent occurs due to such a failure of the motor drive control device, recovery from the state of overcurrent cannot be expected. However, since the state of overcurrent occurring when the overload is applied cannot not be distinguished from the state of overcurrent occurring due to failure of the motor drive control device, a proper abnormality countermeasure action of stopping a motor cannot be performed when the driving of the motor is in the abnormal condition due to the failure of the motor drive control device.

Japanese Patent Application Laid-Open No. 2011-125113 discloses a brushless motor drive device for controlling driving of a brushless motor by turning switch elements on or off. The brushless motor drive device detects an abnormal current flow of a current flowing through the switch elements on a power supply source side and a current flowing from the switch elements on a ground line side, detects that a short-circuit failure has occurred in each current supply line or a brushless motor, and determines the type of short-circuit failure.

In order to detect that an abnormal current flows in each switch element as disclosed in Japanese Patent Application Laid-Open No. 2011-125113, the structure of the motor drive control device is complex, and the manufacturing cost of the motor drive control device is increased.

The present disclosure is related to providing a motor drive control device and a motor drive control method capable of determining that driving of a motor is in an abnormal condition by a simple circuit configuration.

SUMMARY

According to a first aspect of the present disclosure, a motor drive control device includes a motor drive unit having a plurality of switch elements connected to a power supply source and supplying a driving current to a plurality of phase coils of a motor, a control circuit unit outputting, to the motor drive unit, a drive control signal for operating the plurality of switch elements to sequentially switch energization patterns for the plurality of phase coils, and a current detecting circuit for detecting a voltage value corresponding to a magnitude of the driving current, wherein the control circuit unit includes a first determination unit determining whether a state of overcurrent where a magnitude of the driving current exceeds a predetermined overcurrent threshold occurs based on the voltage value each time an energization pattern is switched, and a second determination unit determining whether driving of the motor is in an abnormal condition based on a determination result of the first determination unit for a plurality of energization patterns.

Preferably, the control circuit unit repeatedly performs one cycle of switching control for switching the energization patterns of the plurality of phase coils in a predetermined order, and the second determination unit determines whether the driving of the motor is in the abnormal condition based on a determination result of the first determination unit while the one cycle of switching control is performed, each time the one cycle of switching control is performed.

Preferably, the second determination unit avoids determining that the driving of the motor is in the abnormal condition when the first determination unit determines that the state of overcurrent occurs for all of the energization patterns while the one cycle of switching control is performed, if the one cycle of switching control is performed.

Preferably, the second determination unit calculates a new determination value based on an evaluation value which is, in turn based on the determination result of the first determination unit while the one cycle of switching control is performed each time the one cycle of switching control is performed and a determination value is calculated based on a previous evaluation value, and determines whether the driving of the motor is in the abnormal condition based on a result of comparison between the new determination value and a predetermined abnormality determination threshold.

Preferably, the drive control signal includes a PWM (pulse-width modulation) signal, and the second determination unit changes at least one of the predetermined abnormality determination threshold and the evaluation value based on a duty cycle of the PWM signal.

Preferably, the control circuit unit further includes a drive stop unit performing control for stopping the driving of the motor based on a determination result by the second determination unit.

Preferably, the control circuit unit includes an energization switching circuit outputting a signal for switching the energization pattern according to a rotational position of the motor, an overcurrent detecting circuit receiving a voltage value detected by the current detecting circuit and outputting a signal corresponding to whether the state of overcurrent occurs, an abnormality detecting circuit outputting a signal corresponding to whether the driving of the motor is in the abnormal condition based on the signal output from the overcurrent detecting circuit, and a control signal generation circuit outputting the drive control signal based on the signal output from the energization switching circuit and the signal output from the abnormality detecting circuit.

According to a second aspect of the present disclosure, a motor drive control method drives a motor using a motor drive control device including a motor drive unit having a plurality of switch elements connected to a power supply source and supplying a driving current to a plurality of phase coils of the motor, a control circuit unit outputting, to the motor drive unit, a drive control signal for operating the plurality of switch elements to sequentially switch energization patterns for the plurality of phase coils, and a current detecting circuit detecting a voltage value corresponding to a magnitude of the driving current, the method including a first determination step of determining whether a state of overcurrent where a magnitude of the driving current exceeds a predetermined overcurrent threshold occurs based on the voltage value each time an energization pattern is switched, and a second determination step of determining whether driving of the motor is in an abnormal condition based on a determination result of the first determination step for a plurality of energization patterns.

According to these disclosures, it is possible to provide a motor drive control device and a motor drive control method capable of determining that driving of a motor is in an abnormal condition by a simple circuit configuration.

BRIEF DESCRIPTION OF THE DRAWINGS

FIG. 7 is a table for explaining energization patterns of being in a state of overcurrent when any of the switch elements has failed.

DETAILED DESCRIPTION

Hereinafter, a motor drive control device according to embodiments of the present disclosure will be described.

Embodiments

Figure 1:
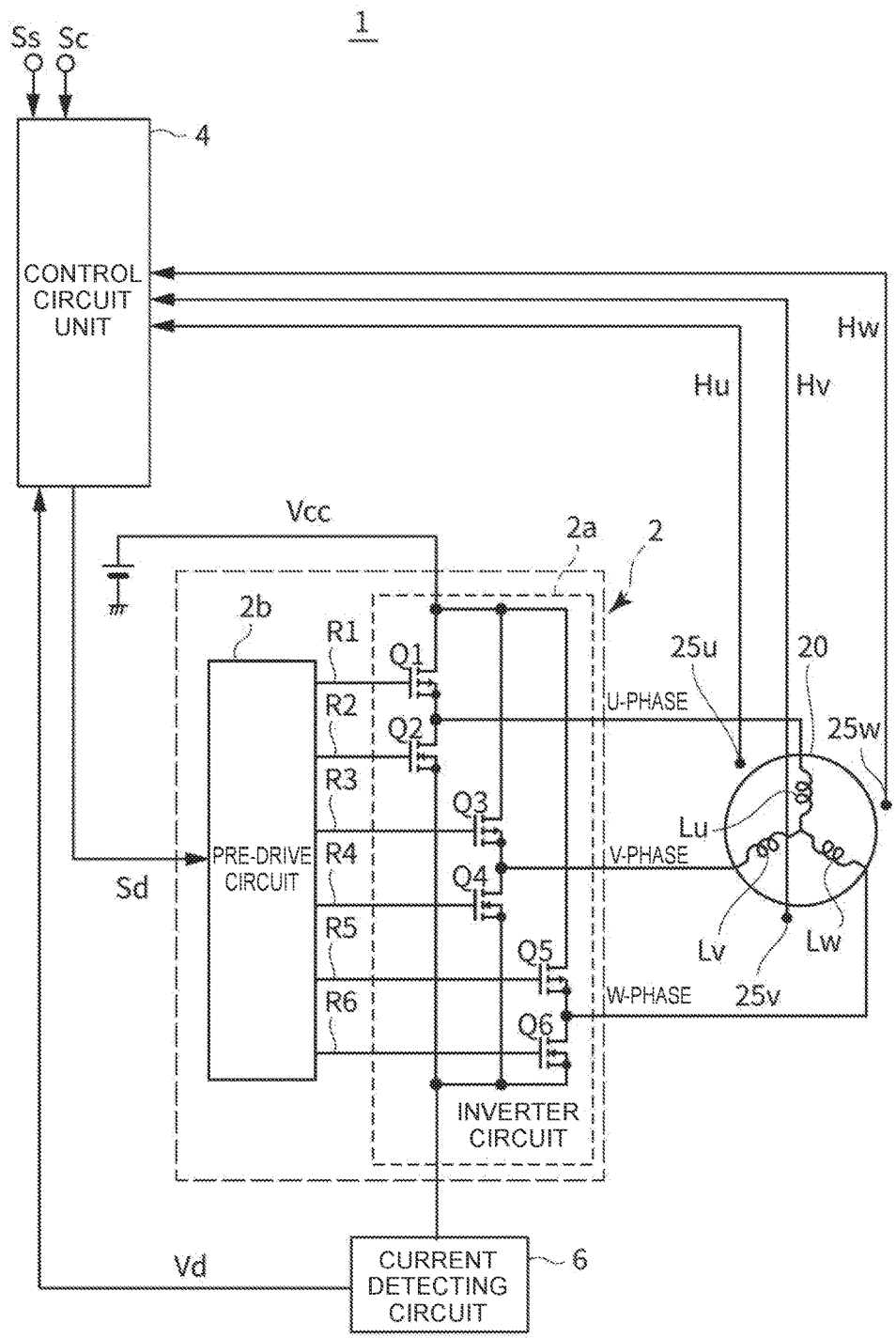
FIG. 1 is a diagram illustrating a circuit configuration of a motor drive control device according to one embodiment of the present disclosure.

FIG. 1 is a diagram illustrating a circuit configuration of a motor drive control device according to one embodiment of the present disclosure.

As illustrated in FIG. 1, a motor drive control device 1 is formed to supply a driving current to a motor 20 to drive the motor 20. In the present embodiment, the motor 20 is, for example, a three-phase brushless motor having coils Lu, Lv, and Lw of the U-phase, the V-phase and the W-phase.

The motor drive control device 1 rotates the motor 20 by causing the driving current flow through the respective phase coils Lu, Lv, and Lw of the motor 20 based on a signal corresponding to a rotation of a rotor of the motor 20.

In the present embodiment, hall elements 25u, 25v, and 25w are arranged in the motor 20 to correspond to the respective phase coils Lu, Lv, and Lw. The three hall elements 25u, 25v, and 25w are arranged around the rotor of the motor 20, for example, at substantially equal intervals (at intervals of 120 degrees). The hall elements 25u, 25v, and 25w detect a magnetic pole of the rotor and output output signals Hu, Hv, and Hw (hereinafter may be referred to as hall signals Hu, Hv and Hw), respectively. The hall signals Hu, Hv, and Hw are signals corresponding to the rotation of the rotor of the motor 20. The rotational position of the rotor can be estimated based on the hall signals Hu, Hv, and Hw.

The motor drive control device 1 includes a motor drive unit 2, a control circuit unit 4, and a current detecting circuit 6, the motor drive unit 2 having a plurality of switch elements Q1 to Q6 connected to a DC power supply source Vcc and supplying a driving current to the plurality of phase coils Lu, Lv, and Lw of the motor 20, the control circuit unit 4 outputting, to the motor drive unit 2, a drive control signal Sd for operating the plurality of switch elements Q1 to Q6 to sequentially switch energization patterns for the plurality of phase coils Lu, Lv, and Lw, and the current detecting circuit 6 detecting a voltage value corresponding to the magnitude of the driving current. Note that components of the motor drive control device 1 illustrated in FIG. 1 are a part of the entire motor drive control device 1, and that the motor drive control device 1 may include other components in addition to the components illustrated in FIG. 1.

In the present embodiment, the motor drive control device 1 is formed as an integrated circuit device (IC) packaged as a whole. Note that a part of the motor drive control device 1 may be packaged as one integrated circuit device, or one integrated circuit device may be formed by packaging the whole or a part of the motor drive control device 1 together with another device.

The motor drive unit 2 selectively energizes the plurality of phase coils of the motor 20. The motor drive unit 2 includes an inverter circuit 2a and a pre-drive circuit 2b. The inverter circuit 2a selectively energizes the respective phase coils Lu, Lv, and Lw of the motor 20 based on output signals R1 to R6 output from the pre-drive circuit 2b to rotate the motor 20.

In the present embodiment, the inverter circuit 2a includes six switch elements Q1 to Q6 for supplying a driving current to each of the coils Lu, Lv, and Lw of the motor 20. The switch elements Q1, Q3, and Q5 are high-side switch elements consisting of P-channel MOSFETs (Metal-Oxide-Semiconductor Field Effect Transistors), the switch elements Q1, Q3, and Q5 being connected to the positive pole side of the power supply source Vcc. The switch elements Q2, Q4, and Q6 are low-side switch elements consisting of N-channel MOSFETs, the switch elements Q2, Q4, and Q6 being connected to the negative pole side of the power supply source Vcc. The switch elements Q1, Q3, and Q5 are combined with the switch elements Q2, Q4, and Q6, respectively, so that the two switch elements combined are connected in series. These three series circuits are connected in parallel to form a bridge circuit. A connecting point between the switch elements Q1 and Q2 is connected to the coil Lu of U-phase, a connecting point between the switch elements Q3 and Q4 is connected to the coil Lv of the V-phase, and a connecting point between the switch elements Q5 and Q6 is connected to the coil Lw of W-phase.

The pre-drive circuit 2b generates an output signal for driving the inverter circuit 2a under the control of the control circuit unit 4, and outputs the generated output signal to the inverter circuit 2a. The pre-drive circuit 2b is provided with a plurality of output terminals to be connected to corresponding gate terminals of the six switch elements Q1 to Q6 in the inverter circuit 2a. The pre-drive circuit 2b outputs output signals R1 to R6 from the corresponding output terminals based on the drive control signal Sd output from the control circuit unit 4 to control the ON/OFF operation of the switch elements Q1 to Q6. When these output signals R1 to R6 are output, the switch elements Q1 to Q6 corresponding to the output signals R1 to R6, respectively, are turned on and off, and a driving signal is output to the motor 20 to supply power to each phase of the motor 20.

In the present embodiment, the hall signals Hu, Hv, and Hw output from the hall elements 25u, 25v, and 25w, a rotational speed command signal Sc, and a start signal Ss are input to the control circuit unit 4.

The hall signals Hu, Hv, and Hw are input to the control circuit unit 4 from the motor 20. The control circuit unit 4 acquires actual rotational speed information on actual rotational speed of the rotor of the motor 20 using the hall signals Hu, Hv, and Hw, and controls the driving of the motor 20. The control circuit unit 4 detects a rotational position of the rotor of the motor 20 using the hall signals Hu, Hv, and Hw, and controls the driving of the motor 20.

Note that the control circuit unit 4 may be formed to have other information on the rotational state of the motor 20 input to the control circuit unit 4 in addition to the hall signals Hu, Hv, and Hw. For example, a signal (pattern FG) generated using a coil pattern formed on a circuit board located on the rotor side may be input as an FG signal corresponding to the rotation of the rotor of the motor 20. The rotational state of the motor 20 may be detected based on a detection result of a rotational position detecting circuit detecting a counter-electromotive voltage caused in the phases (U, V, W phases) of the motor 20. An encoder or a resolver or the like may be formed to detect information such as the rotational speed of the motor 20.

The rotational speed command signal Sc is input, for example, from the outside of the control circuit unit 4. The rotational speed command signal Sc is a signal related to the rotational speed of the motor 20. The rotational speed command signal Sc is, for example, a PWM (pulse-width modulation) signal corresponding to a target rotational speed of the motor 20. In other words, the rotational speed command signal Sc is information corresponding to a target value of the rotational speed of the motor 20. Note that a clock signal may be input as the rotational speed command signal Sc.

The start signal Ss is input, for example, from the outside of the control circuit unit 4. The start signal Ss is a signal for setting a driving state of performing the drive control of the motor 20 or a standby state of not performing the drive control.

The control circuit unit 4 is formed by a microcomputer, a digital circuit, and the like. The control circuit unit 4 outputs the drive control signal Sd for driving the motor 20 to the motor drive unit 2 in order to control the rotation of the motor 20. The control circuit unit 4 sequentially switches energization patterns for the plurality of phase coils Lu, Lv, and Lw by outputting the drive control signal Sd for operating the plurality of switch elements Q1 to Q6 to the motor drive unit 2. In other words, the control circuit unit 4 outputs a drive control signal Sd to the pre-drive circuit 2b based on the hall signals Hu, Hv, and Hw, the rotational speed command signal Sc, and the start signal Ss. The control circuit unit 4 performs the rotation control of the motor 20 so that the motor 20 rotates at the rotational speed corresponding to the rotational speed command signal Sc by outputting the drive control signal Sd.

The motor 20 has the three-phase coils Lu, Lv, and Lw, resulting in provision of six energization patterns. In other words, the six energization patterns include (1) a first energization pattern including a combination of a high-side U-phase and a low-side V-phase, (2) a second energization pattern including a combination of the high-side U-phase and a low-side W-phase, (3) a third energization pattern including a combination of a high-side V-phase and the low-side W-phase, (4) a fourth energization pattern including a combination of a high-side V-phase and a low-side U-phase, (5) a fifth energization pattern including a combination of a high-side W-phase and the low-side U-phase, and (6) a sixth energization pattern including a combination of the high-side W-phase and the low-side V-phase.

When the motor 20 is rotated in a predetermined direction, the control circuit unit 4 repeatedly performs one cycle of switching control for switching all of the six energization patterns in a predetermined order. The predetermined order is, for example, as follows: the first energization pattern, the second energization pattern, the third energization pattern, the fourth energization pattern, the fifth energization pattern, and the sixth energization pattern.

When the motor 20 is rotated in a direction opposite the above-described predetermined direction, the control circuit unit 4 repeatedly performs one cycle of switching control for switching all of the six energization patterns in a reverse order to the above-described predetermined order from the first energization pattern to the sixth energization pattern (in an order from the sixth energization pattern to the first energization pattern).

The current detecting circuit 6 detects a voltage value corresponding to the magnitude of the driving current in the motor 20. In the present embodiment, the current detecting circuit 6 includes a current detecting resistor provided between the inverter circuit 2a and a ground potential (the negative pole of the power supply source Vcc), and detects the voltage value corresponding to a coil current in the motor 20. In other words, the coil current, having flowed through respective phases of the coils Lu, Lv, and Lw of the motor 20, flows through the inverter circuit 2a and the current detecting resistor into the ground potential. The current detecting circuit 6 can detect the magnitude of the coil current in the motor 20 as a voltage value based on a voltage at both ends of the current detecting resistor. The current detecting circuit 6 outputs a detection voltage signal (an example of the voltage value) Vd as the detection result. The detection voltage signal Vd is input to the control circuit unit 4.

[Explanation of Control Circuit Unit 4]

In the present embodiment, the control circuit unit 4 has an abnormality determination function that determines whether the driving of the motor 20 is in an abnormal condition. In other words, the control circuit unit 4 determines whether the state of overcurrent where the magnitude of the driving current in the motor 20 exceeds a predetermined overcurrent threshold (hereinafter may be simply referred to as a state of overcurrent) occurs based on the voltage value detected by the current detecting circuit 6 each time the energization pattern is switched (an example of a first determination unit). Subsequently, the control circuit unit 4 determines whether the driving of the motor 20 is in an abnormal condition based on the determination result indicating whether the state of overcurrent occurs for the plurality of energization patterns (an example of a second determination unit). In other words, the control circuit unit 4 performs a motor drive control method including a first determination step of determining whether the state of overcurrent where the magnitude of the driving current exceeds the predetermined overcurrent threshold occurs based on the voltage value detected by the current detecting circuit 6 each time the energization pattern is switched, and a second determination step of determining whether the driving of the motor 20 is in the abnormal condition based on the determination result indicating whether the state of overcurrent occurs for the plurality of energization patterns. The control circuit unit 4 controls the stoppage of the driving of the motor 20 based on the determination result which indicates whether the driving of the motor 20 is in the abnormal condition (an example of a drive stop unit). As described above, the control circuit unit 4 repeatedly performs one cycle of switching control for switching the six energization patterns of the three-phase (an example of a plurality of phases) coils Lu, Lv, and Lw in a predetermined order. The second determination unit determines whether the driving of the motor 20 is in the abnormal condition based on the determination result obtained by the first determination unit while one cycle of switching control is performed, each time one cycle of switching control is performed.

Figure 2:
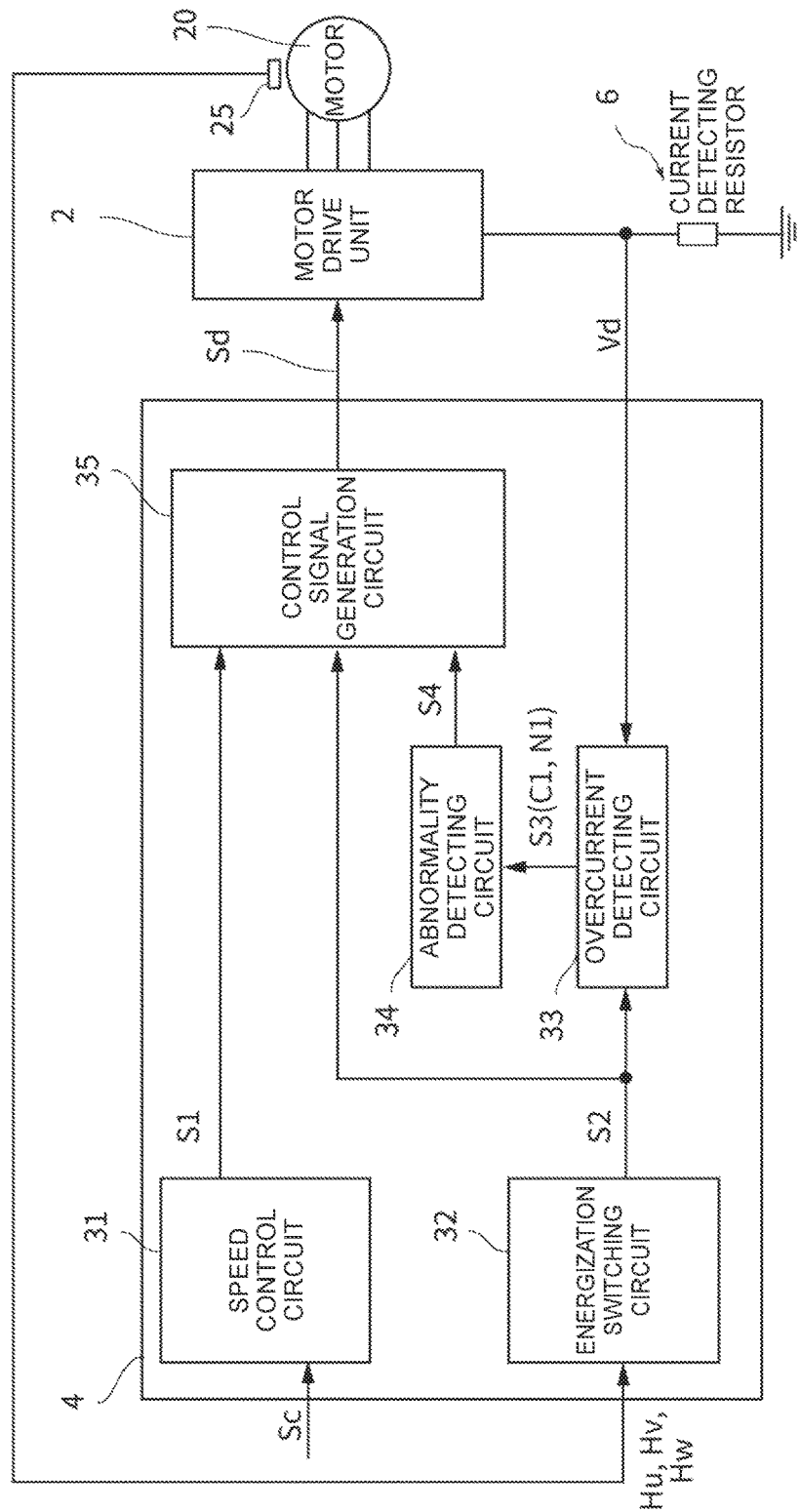
FIG. 2 is a block diagram illustrating a configuration of a control circuit unit.

FIG. 2 is a block diagram illustrating a configuration of the control circuit unit 4.

FIG. 2 illustrates the configuration of the control circuit unit 4, and transmission and reception of signals, information, and the like between the circuits mainly relating to explanation of the abnormality determination function. The hall elements 25u, 25v, and 25w are simply shown as one hall element 25.

As illustrated in FIG. 2, the control circuit unit 4 includes a speed control circuit 31, an energization switching circuit 32, an overcurrent detecting circuit (an example of the first determination unit) 33, an abnormality detecting circuit (an example of the second determination unit) 34, and a control signal generation circuit (an example of the drive stop unit) 35.

The rotational speed command signal Sc is input to the speed control circuit 31. The speed control circuit 31 outputs a rotational speed signal S1 based on the rotational speed command signal Sc so that the motor 20 rotates at the rotational speed corresponding to the rotational speed command signal Sc. The speed control circuit 31 outputs the rotational speed signal S1 based on the actual rotational speed information (not illustrated) on the actual rotational speed of the rotor of the motor 20 acquired based on the hall signals Hu, Hv, and Hw input to the control circuit unit 4.

The hall signals Hu, Hv, and Hw are input to the energization switching circuit 32. The energization switching circuit 32 outputs an energization switching command signal S2 for switching the energization pattern according to the rotational position of the motor 20. In other words, the energization switching circuit 32 performs the switching control of the energization pattern by outputting an energization switching command signal S2. The energization switching command signal S2 is, for example, a signal capable of determining the timing of switching outputs of the hall signals Hu, Hv, and Hw between high and low, but is not limited to such a signal.

The overcurrent detecting circuit 33 determines, as the first determination unit, whether the state of overcurrent where the magnitude of the driving current exceeds the predetermined overcurrent threshold occurs based on the voltage value detected by the current detecting circuit 6 each time the energization pattern is switched. The voltage value detected by the current detecting circuit 6 is input to the overcurrent detecting circuit 33. The overcurrent detecting circuit 33 outputs an overcurrent detection signal S3 generated based on the determination result indicating whether the state of overcurrent where the magnitude of the driving current in the motor 20 exceeds the predetermined overcurrent threshold occurs. Specifically, the detection voltage signal Vd of the current detecting circuit 6 is input to the overcurrent detecting circuit 33 using the current detecting resistor. The overcurrent detecting circuit 33 can compare the detection voltage signal Vd with the predetermined overcurrent threshold using a voltage comparing circuit including a comparator or the like, for example, to determine whether the state of overcurrent where the magnitude of the driving current exceeds the overcurrent threshold occurs. The energization switching command signal S2 is input to the overcurrent detecting circuit 33. The overcurrent detecting circuit 33 performs an energization switching count control process and an overcurrent detection process as described later. The overcurrent detecting circuit 33 generates an energization count value a based on the energization switching command signal S2. The overcurrent detecting circuit 33 also generates an overcurrent detection value N1 based on the determination result indicating whether the state of overcurrent occurs. The overcurrent detecting circuit 33 outputs the overcurrent detection value N1 and the energization count value C1 as the overcurrent detection signal S3.

The abnormality detecting circuit 34 determines, as the second determination unit, whether the driving of the motor 20 is in the abnormal condition based on the determination result obtained by the overcurrent detecting circuit 33 while one cycle of switching control is performed, each time one cycle of switching control is performed. The abnormality detecting circuit 34 outputs an abnormality determination signal S4 corresponding to whether the driving of the motor 20 is in the abnormal condition (hereinafter may be simply referred to as an abnormal condition) based on the signal output from the overcurrent detecting circuit 33. The overcurrent detection signal S3 output from the overcurrent detecting circuit 33 is input to the abnormality detecting circuit 34. The abnormality detecting circuit 34 performs an abnormality detection process as described later based on the overcurrent detection value N1 and the energization count value C1 included in the overcurrent detection signal S3, and outputs the abnormality determination signal S4.

The control signal generation circuit 35 outputs the drive control signal Sd based on the rotational speed signal S1 output from the speed control circuit 31, the energization switching command signal S2 output from the energization switching circuit 32, and the abnormality determination signal S4 output from the abnormality detecting circuit 34. In other words, when the abnormality detecting circuit 34 does not output the abnormality determination signal S4 corresponding to the determination result indicating that the driving of the motor 20 is in the abnormal condition, the control signal generation circuit 35 generates the drive control signal Sd based on the rotational speed signal S1 output from the speed control circuit 31, and outputs the generated signal Sd to the motor drive unit 2. At this time, the control signal generation circuit 35 sequentially switches the energization pattern of the driving signal based on the energization switching command signal S2 output from the energization switching circuit 32 to generate the drive control signal Sd.

In the present embodiment, the drive control signal Sd is a PWM (pulse-width modulation) signal. The torque of the motor 20 can be adjusted by adjusting the duty cycle of the drive control signal Sd.

In the present embodiment, the control signal generation circuit 35 stops the driving of the motor 20 as the drive stop unit based on the determination result obtained by the abnormality detecting circuit 34. In other words, when the abnormality detecting circuit 34 outputs the abnormality determination signal S4 corresponding to the determination result that the driving of the motor 20 is in the abnormal condition, the control signal generation circuit 35 outputs the drive control signal Sd based on the abnormality determination signal S4, and performs an abnormality countermeasure action. The control signal generation circuit 35 functions, for example, as the drive stop unit to stop the driving of the motor 20 as the abnormality countermeasure action. For example, the control signal generation circuit 35 outputs the drive control signal Sd to turn off all of the switch elements Q1 to Q6 so that the driving of the motor 20 can be stopped.

Figure 3:
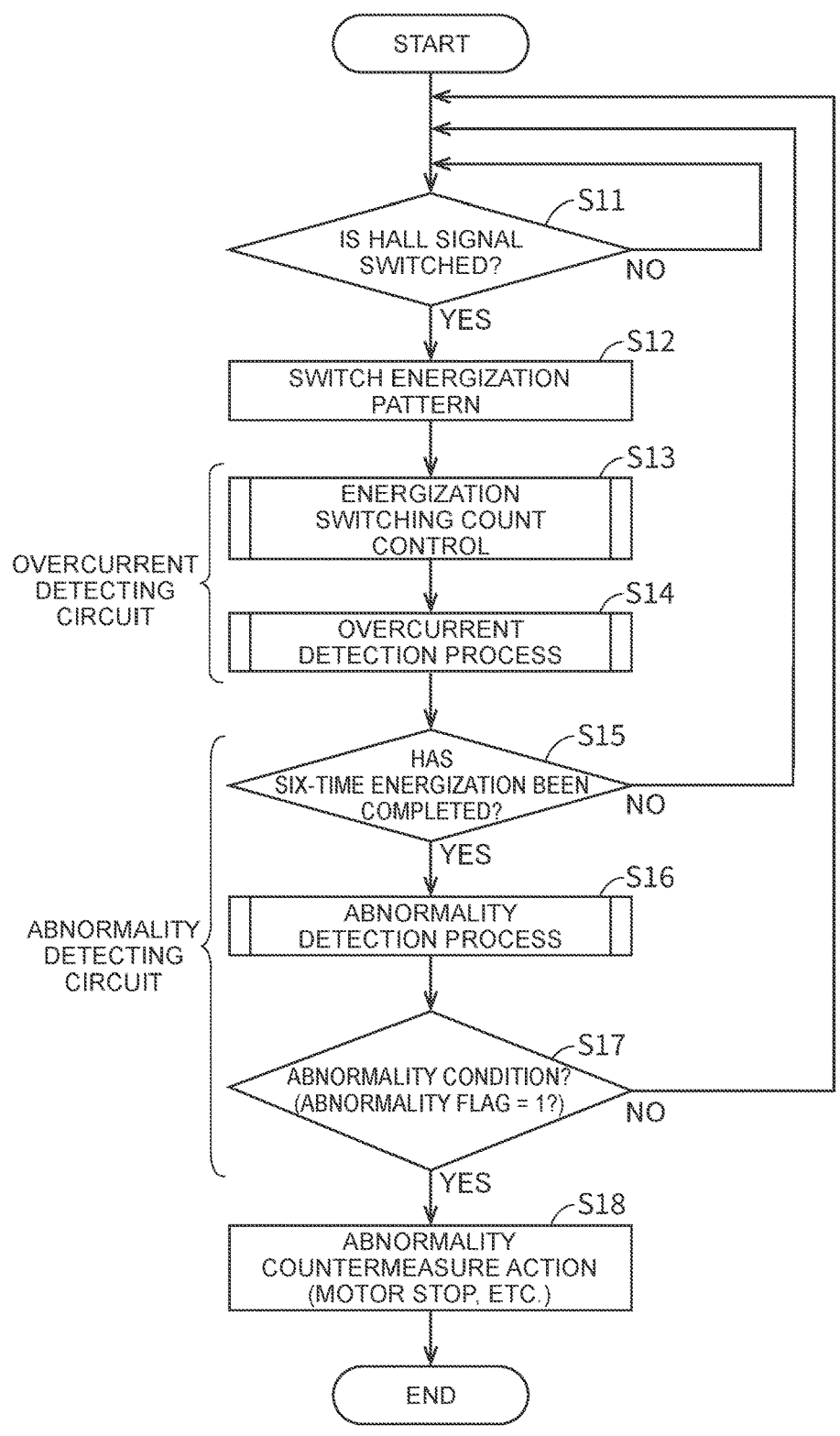
FIG. 3 is a flowchart illustrating an operation of the control circuit unit.

FIG. 3 is a flowchart illustrating an operation of the control circuit unit 4.

When the motor drive control device 1 is in operation, the control circuit unit 4 performs the following operation.

As illustrated in FIG. 3, in step S11, the control circuit unit 4 determines whether the hall signals Hu, Hv, and Hw have been switched between High and Low. When it is determined that the hall signals Hu, Hv, and Hw have been switched between High and Low, the control circuit unit 4 switches the energization pattern in step S12. Subsequently, the energization pattern is switched to the next energization pattern. In other words, the control signal generation circuit 35 switches the energization pattern according to the timing of switching the hall signals Hu, Hv, and Hw between High and Low based on the energization switching command signal S2 output from the energization switching circuit 32, and outputs the drive control signal Sd.

At minimum, the processes of subsequent steps S13 to S15 are performed each time the energization pattern switches.

In step S13, the overcurrent detecting circuit 33 performs the energization switching count control process.

In step S14, the overcurrent detecting circuit 33 performs the overcurrent detection process.

In step S15, the abnormality detecting circuit 34 determines whether six-time energization has been completed based on the energization count value C1 included in the overcurrent detection signal S3 output from the overcurrent detecting circuit 33.

As described later, the energization count value C1 is a counter that is incremented each time the energization is performed in one energization pattern. The energization count value C1 is reset to zero each time one cycle of switching control is completed, that is, each time the energization pattern is switched six times. The abnormality detecting circuit 34 determines that six-time energization has been completed (YES) when the energization count value C1 becomes a predetermined value of 0 to 5 (for example, when C1=5). When the energization count value C1 is a value other than the predetermined value, the process is returned to the process of step S11.

When determining, in step S15, that six-time energization has been completed (YES), the abnormality detecting circuit 34 performs the processes of step S16 and step S17. In other words, the abnormality detecting circuit 34 performs the process of determining whether the driving of the motor 20 is in the abnormal condition each time one cycle of switching control is performed.

In other words, in step S16, the abnormality detecting circuit 34 performs the abnormality detection process.

In step S17, the abnormality detecting circuit 34 determines whether the driving of the motor 20 is in the abnormal condition. The abnormality detecting circuit 34 determines whether the driving of the motor 20 is in the abnormal condition based on whether an abnormality flag is raised in the abnormality detecting circuit 34 (whether the abnormality flag is set to 1) as described later.

When the abnormality detecting circuit 34 determines, in step S17, that the driving of the motor 20 is not in the abnormal condition (NO), the process is returned to the process of step S11. In other words, when the abnormality detecting circuit 34 does not output the abnormality determination signal S4 indicating that the driving of the motor 20 is in the abnormal condition, the motor 20 continues to drive.

When the abnormality detecting circuit 34 determines, in step S17, that the driving of the motor 20 is in the abnormal condition (YES), the process proceeds to step S18. In step S18, the control circuit unit 4 performs the abnormality countermeasure action. In other words, when the abnormality detecting circuit 34 outputs the abnormality determination signal S4 indicating that the driving of the motor 20 is in the abnormal condition, the control signal generation circuit 35 performs the abnormality countermeasure action as described above. Subsequently, the driving of the motor 20 is stopped, for example.

Figure 4:
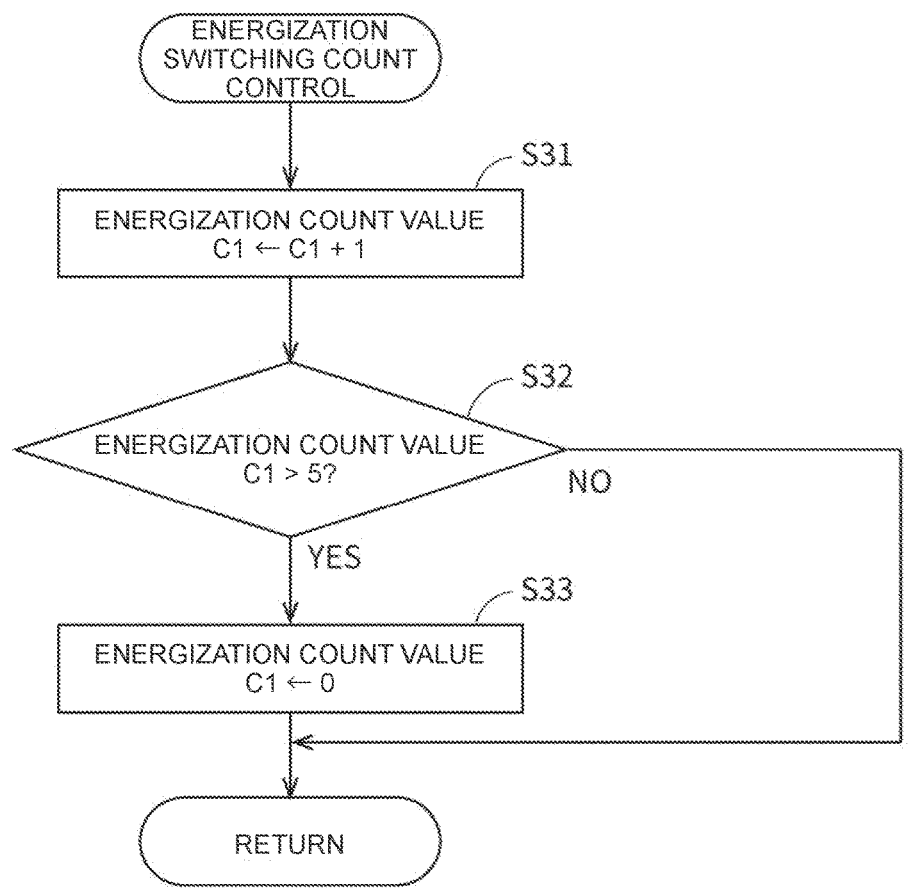
FIG. 4 is a flowchart illustrating an energization switching count control process.

FIG. 4 is a flowchart illustrating the energization switching count control process.

As illustrated in FIG. 4, in step S31, the overcurrent detecting circuit 33 adds 1 to the energization count value C1.

In step S32, the overcurrent detecting circuit 33 determines whether the energization count value C1 is greater than 5. When the energization count value C1 is greater than 5 (YES), the process proceeds to step S33. When the energization count value C1 is not greater than 5 (NO), the energization switching count control process is completed.

In step S33, the overcurrent detecting circuit 33 resets the energization count value C1 to zero, and the energization switching count control process is completed.

In other words, in the present embodiment, the energization count value C1 takes any value of 0, 1, 2, 3, 4, and 5. The energization count value C1 is incremented by 1 each time the switching control of the energization pattern is performed one time, with the result that the energization count value C1 takes the same value each time six-time switching control is performed. The energization count value C1 is repeatedly counted each time one cycle of switching control is performed.

Figure 5:
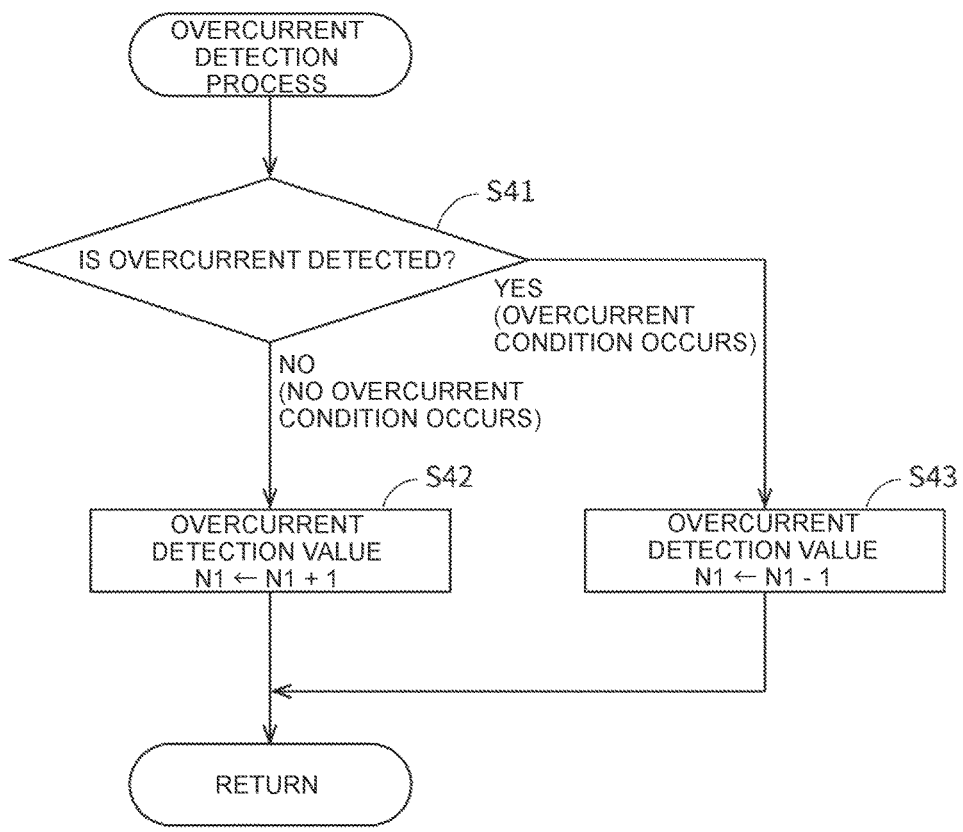
FIG. 5 is a flowchart illustrating an overcurrent detection process.

FIG. 5 is a flowchart illustrating the overcurrent detection process.

In the overcurrent detection process, the overcurrent detection value N1 is counted according to the detection result indicating whether the state of overcurrent where the magnitude of the driving current in the motor 20 exceeds a predetermined overcurrent threshold occurs. The overcurrent detection value N1 is a counter incremented or decremented based on the determination result indicating whether the state of overcurrent occurs. Note that, as described later, the overcurrent detection value N1 is reset to zero each time one cycle of switching control is performed.

As illustrated in FIG. 5, the overcurrent detecting circuit 33 detects, in step S41, whether the state of overcurrent occurs. In other words, the overcurrent detecting circuit 33 determines whether the detection voltage signal Vd exceeds the predetermined overcurrent threshold. If the detection voltage signal Vd exceeds the predetermined overcurrent threshold, the overcurrent detecting circuit 33 detects that the state of overcurrent occurs. If the overcurrent does not occur (NO), the process proceeds to step S42, and if the state of overcurrent occurs (YES), the process proceeds to step S43.

In step S42, the overcurrent detecting circuit 33 adds 1 to the overcurrent detection value N1.

On the other hand, in step S43, the overcurrent detecting circuit 33 subtracts 1 from the overcurrent detection value N1.

When the process of step S42 or step S43 is performed, the overcurrent detection process is completed. The counted overcurrent detection value N1 and the energization count value C1 as the overcurrent detection signal S3 are output to the abnormality detecting circuit 34. As illustrated in FIG. 3, the abnormality detecting circuit 34 can determine whether six-time energization is completed, that is, whether one cycle of switching control is completed, based on a value of the energization count value C1 (step S15). The abnormality detection process of step S16 is performed each time one cycle of switching control is performed (YES).

Figure 6:
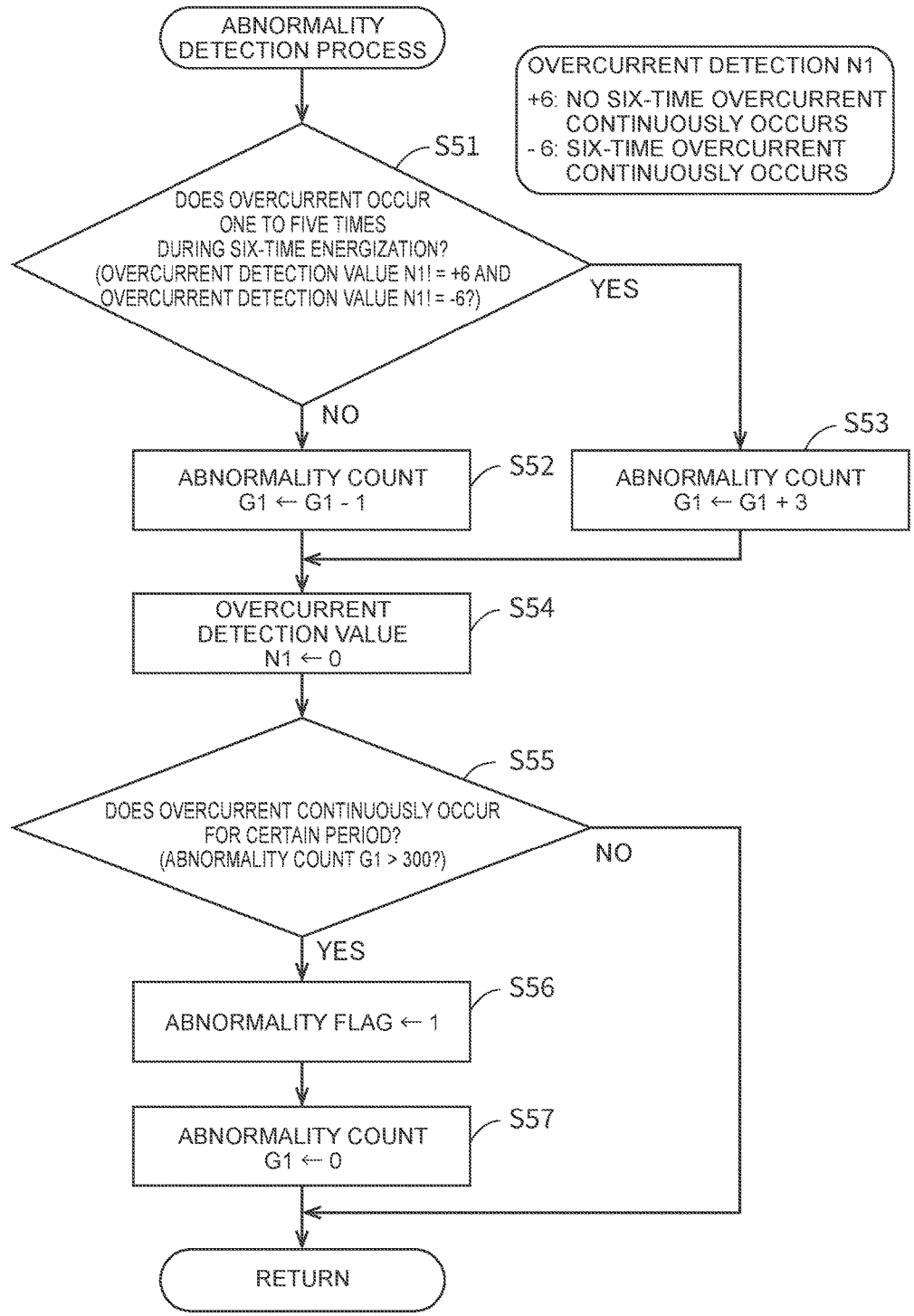
FIG. 6 is a flowchart illustrating an abnormality detection process.

FIG. 6 is a flowchart illustrating the abnormality detection process.

In the abnormality detection process, the abnormality detecting circuit 34 determines whether the driving of the motor 20 is in the abnormal condition based on the determination result indicating whether the state of overcurrent occurs while one cycle of switching control is performed. In the present embodiment, when the state in which the state of overcurrent is determined to continuously occur for some energization patterns while one cycle of switching control is performed (while six energization patterns are sequentially switched), the abnormality detecting circuit 34 determines that the driving of the motor 20 is in the abnormal condition.

The abnormality detecting circuit 34, as the second determination unit, calculates a new determination value based on an evaluation value based on the determination result obtained by the overcurrent detecting circuit 33 as the first determination unit while one cycle of switching control is performed each time one cycle of switching control is performed and a determination value is calculated based on the previous evaluation value, and determines whether the driving of the motor 20 is in the abnormal condition based on a result of comparison between the new determination value and a predetermined abnormality determination threshold. In other words, in the overcurrent detection process in the overcurrent detecting circuit 33, the overcurrent detecting circuit 33 determines whether the state of overcurrent occurs for all energization patterns (six energization patterns) while one cycle of switching control is performed, and outputs the determination result as the overcurrent detection value N1. In other words, the overcurrent detection value N1 output after one cycle of switching control is performed is a value corresponding to the determination result indicating whether the state of overcurrent occurs while one cycle of switching control is performed. In the present embodiment, the new determination value (new abnormality count G1) is calculated based on the estimation value based on the overcurrent detection value N1 and the determination value calculated based on the previous estimation value (hereinafter may be referred to as an abnormality count G1). The abnormality detecting circuit 34 determines whether the driving of the motor 20 is in the abnormal condition based on a result of comparison between the new abnormality count G1 and the predetermined abnormality determination threshold. In the present embodiment, when the abnormality count G1 exceeds the predetermined abnormality determination threshold, the abnormality detecting circuit 34 determines that the driving of the motor 20 is in the abnormal condition.

As illustrated in FIG. 6, in step S51, the abnormality detecting circuit 34 determines whether the overcurrent detecting circuit 33 determines that the state of overcurrent occurs one to five times during energization in six energization patterns.

The abnormality detecting circuit 34 performs this determination based on a value of the overcurrent detection value N1. In other words, when the abnormality detecting circuit 34 does not determine that the state of overcurrent continuously occurs six times while one cycle of switching control is performed (when the abnormality detecting circuit 34 does not determine that the state of overcurrent occurs for all of the energization patterns while one cycle of switching control is performed), a value of the overcurrent detection value N1 becomes "plus 6." On the other hand, when the abnormality detecting circuit 34 determines that the state of overcurrent continuously occurs six times while one cycle of switching control is performed (when the abnormality detecting circuit 34 determines that the state of overcurrent occurs for all of the energization patterns while one cycle of switching control is performed), a value of the overcurrent detection value N1 becomes "minus 6." Thus, in step S51, the abnormality detecting circuit 34 determines whether to satisfy both conditions where a value of the overcurrent detection value N1 is not "plus 6," and a value of the overcurrent detection value N1 is not "minus 6."

When the abnormality detecting circuit 34 does not determine that the state of overcurrent occurs one to five times during energization in six energization patterns (NO), the process proceeds to step S52. In step S52, the abnormality detecting circuit 34 subtracts 1 (an example of the evaluation value) from a value of the abnormality count G1.

When the abnormality detecting circuit 34 determines that the state of overcurrent occurs one to five times during energization in six energization patterns (YES), the process proceeds to step S53. In step S53, the abnormality detecting circuit 34 adds 3 (an example of the evaluation value) to a value of the abnormality count G1. In other words, the abnormality detecting circuit 34 adds 3 to a value of the abnormality count G1 when determining that the state of overcurrent occurs for some energization patterns.

In the present embodiment, the evaluation value "3" added to the abnormality count G1 when the abnormality detecting circuit 34 determines that the state of overcurrent occurs for some energization patterns is weighted larger than the evaluation value "1" subtracted from the abnormality count G1 if no such determination is made.

In step S54, the abnormality detecting circuit 34 resets the overcurrent detection value N1 to zero. Thus, the counting of the overcurrent detection value N1 for the next single cycle of switching control starts from zero.

In step S55, the abnormality detecting circuit 34 determines whether the determination of a state of overcurrent for some energization patterns while one cycle of switching control is performed continuously occurs for a certain period of time. In other words, the abnormality detecting circuit 34 determines whether a value of the abnormality count G1 is greater than the predetermined abnormality determination threshold (for example, 300).

When the abnormality detecting circuit 34 determines that the state in which the state of overcurrent is determined for some energization patterns to continuously occur for a certain period of time (i.e., when a value of the abnormality count G1 is greater than 300) (YES), then the process proceeds to step S56.

In step S56, the abnormality detecting circuit 34 sets the abnormality flag to 1 (raises the abnormality flag). In step S57, the abnormality detecting circuit 34 resets the abnormality count G1 to zero, and the abnormality detection process is completed. When the abnormality flag is set to 1 and the abnormality detection process is completed, the abnormality detecting circuit 34 determines that the driving of the motor 20 is in the abnormal condition, as illustrated in FIG. 3 (YES in step S17). Subsequently, the abnormality countermeasure action is performed (step S18).

On the other hand, in step S55, when the abnormality detecting circuit 34 does not determine that the state in which the state of overcurrent is determined for some energization patterns to continuously occur for a certain period of time (i.e., when a value of the abnormality count G1 is not greater than 300) (NO), the abnormality detection process is completed. Thus, the abnormality detecting circuit 34 does not determine that the driving of the motor 20 is in the abnormal condition. In other words, if a value of the overcurrent detection value N1 is "plus 6" or "minus 6" when the abnormality detection process starts, the abnormality detecting circuit 34 avoids determining that the driving of the motor 20 is in the abnormal condition. In other words, when the abnormality detecting circuit 34 does not determine that the state of overcurrent occurs for all of the energization patterns while one cycle of switching control is performed in a case in which one cycle of switching control is performed, the control circuit unit 4 avoids determining that the driving of the motor 20 is in the abnormal condition. When the abnormality detecting circuit 34 determines that the state of overcurrent occurs for all of the energization patterns while one cycle of switching control is performed, the control circuit unit 4 avoids determining that the driving of the motor 20 is in the abnormal condition. In other words, when the overcurrent detecting circuit 33 as the first determination unit determines that the state of overcurrent occurs for all of the energization patterns while one cycle of switching control is performed in a case in which one cycle of switching control is performed, the abnormality detecting circuit 34 as the second determination unit avoids determining that the driving of the motor 20 is in the abnormal condition.

Note that, in this case, when the next single cycle of switching control is performed, a predetermined value is incremented or decremented (3 is added or 1 is subtracted) with respect to the abnormality count G1 at this time according to the result of the overcurrent detection process while one cycle of switching control is performed.

As described above, the control circuit unit 4 has the abnormality determination function, and the abnormality countermeasure action is performed when the following abnormal condition occurs.

In other words, in the motor drive control device 1, at least any of the six switch elements Q1 to Q6 provided in the inverter circuit 2a may fail, causing a state of short-circuit. If such failure occurs, the state of overcurrent may occur only for some energization patterns corresponding to the failed switch elements Q1 to Q6 among the six energization patterns. When such an abnormal condition has occurred, the abnormality determination function can determine that the abnormal condition has occurred and perform the abnormality countermeasure action.

FIG. 7 is a table that explains energization patterns of being in the state of overcurrent when any of the switch elements Q1 to Q6 has failed.

FIG. 7 shows energization patterns (marked with 0) with normal detection voltage signal Vd and energization patterns (marked with 4 or x) which cause the state of overcurrent when any of the switch elements Q1 to Q6 has failed.

The energization patterns causing the state of overcurrent include an energization pattern (marked with 4) causing the state of overcurrent due to a more sudden increase in current than in the normal energization pattern (marked with 0) and an energization pattern (marked with x) causing the state of overcurrent due to a more sudden change in current than in the energization pattern marked with 4. In other words, when any of the switch elements Q1 to Q6 to be turned on in the corresponding energization pattern fails, the energization pattern causes the state of overcurrent due to a more sudden increase in current than in the energization pattern marked with 0 (marked with 4). On the other hand, the energization pattern in which the switch element of the same phase making a pair with the failed switch element Q1 to Q6 is to be turned on causes the state of overcurrent due to a more sudden change in current than in the energization pattern marked with 4 because the power supply source Vcc and the ground potential are in a state of short-circuit (marked with x).

As an example, the case in which the W-phase high-side (WH) switch element Q5 fails to a state of short-circuit will be described.

Figure 8:
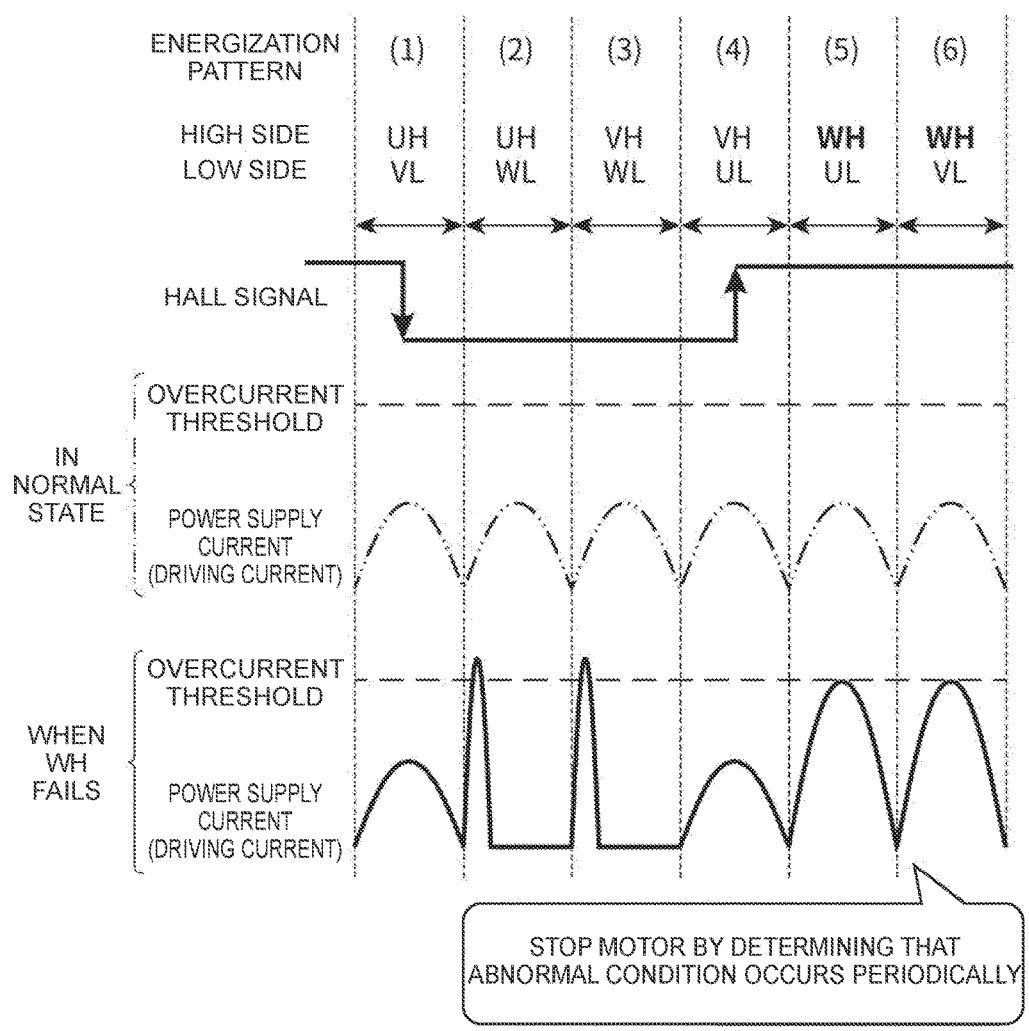
FIG. 8 is a timing chart for explaining a transition of a power supply current when the W-phase high-side (WH) switch element fails, resulting in a short circuit.

FIG. 8 is a timing chart for explaining a transition of a power supply current when the W-phase high-side (WH) switch element Q5 fails to a state of short-circuit.

In FIG. 8, an upper stage shows the energization patterns and a transition of one-phase of a hall signal, a middle stage schematically shows a waveform example of a normal driving current, and a lower stage schematically shows a waveform example of the driving current when the switch element Q5 fails.

In this case, since the W-phase switch elements Q5 and Q6 are not turned on in the first energization pattern (1) and the fourth energization pattern (4), the overcurrent does not occur for the first energization pattern (1) and the fourth energization pattern (4).

Since the switch element Q5 to be originally turned on in the fifth energization pattern (5) and the sixth energization pattern (6) fails, the state of overcurrent occurs for the fifth energization pattern (5) and the sixth energization pattern (6) due to a more sudden increase in driving current than in the energization patterns (1) and (4).

The W-phase low-side (WL) switch element Q6 making a pair with the failed switch element Q5 is turned on in the second energization pattern (2) and the third energization pattern (3). The state of overcurrent occurs for the second energization pattern (2) and the third energization pattern (3) due to a more sudden increase in driving current than in the energization patterns (5) and (6).

Thus, when one of the switch elements Q1 to Q6 has failed and the abnormal condition has occurred, it is determined that the state of overcurrent occurs for four energization patterns while one cycle of switching control is performed. When the state in which the state of overcurrent is determined to periodically occur continues for a certain period of time, a value of the abnormality count G1 exceeds the abnormality determination threshold. Thus, the control circuit unit 4 determines that the driving of the motor 20 is in the abnormal condition, and the abnormality countermeasure action is performed.

As described above, in the present embodiment, the state of overcurrent caused by failure of the motor drive control device 1 (the driving of the motor 20 is in the abnormal condition) can be determined by distinguishing from the state of overcurrent caused by overload and the like. Accordingly, when the driving of the motor 20 is in the abnormal condition, the abnormality countermeasure action can be properly performed. For example, since the driving of the motor 20 can be stopped, the motor drive control device 1 can be repaired or replaced. It can be precisely determined that the driving of the motor 20 is in the abnormal condition by a simple circuit configuration without adding a special circuit. Therefore, the manufacturing cost of the motor drive control device 1 can be reduced.

The evaluation value is incremented or decremented with respect to a value of the abnormality count G1 each time one cycle of switching control is performed, and the abnormal condition is determined based on the value of the abnormality count G1. Even if there is a disturbance in the magnitude of the detection voltage signal Vd, for example, the determination that the driving of the motor 20 is in the abnormal condition is not immediately made. When the driving of the motor 20 is in the abnormal condition in which the state of overcurrent periodically occurs, it can be definitely determined that the driving of the motor 20 is in the abnormal condition.

Since the evaluation value incremented or decremented with respect to the value of the abnormality count G1 is weighted as described above, it can be easily detected that the driving of the motor 20 is in the abnormal condition even if the state of overcurrent is intermittently detected. If the possibility of the abnormal condition is high, it can be immediately determined that the driving of the motor 20 is in the abnormal condition, and the abnormality countermeasure action is performed. Note that the evaluation value incremented or decremented with respect to the value of the abnormality count G1 is not limited to the value in the present embodiment, and may be set appropriately. In some cases, the evaluation value may not be weighted.

When it is determined that the state of overcurrent occurs for all of the energization patterns while one cycle of switching control is performed, the value of the abnormality count G1 is not incremented, and a determination that the driving of the motor 20 is in the abnormal condition is avoided. Accordingly, it can be precisely detected that abnormal conditions such as failure of the switch elements Q1 to Q6 occurs, in order to stop the driving of the motor only if necessary. When it is not necessary to stop the driving of the motor 20 as is the case when the state of overcurrent occurs due to the overload applied to the motor 20, the driving of the motor 20 can be prevented from being stopped.

Although the case where the short-circuit failure has occurred for specific switch elements Q1 to Q6 has been mainly described in the above description, the abnormal condition is not limited to this condition. For example, the driving of the motor 20 is stopped as an abnormality countermeasure action by detecting, as the abnormal conditions, that the state of overcurrent periodically occurs while energization is performed in an energization pattern different from the original energization pattern due to step-out, and a variation in the energization pattern is generated.

[Others]

The motor drive control device is not limited to the circuit configuration as shown in the above embodiments and the variants. For the purposes of the present disclosure, various circuit configurations can be applied.

In the above embodiments, at least one of the predetermined abnormality determination threshold and the evaluation value may be changed based on the duty cycle of the drive control signal Sd. In other words, when the duty cycle is relatively small (on time is short), the state of overcurrent hardly occurs. Therefore, when the duty cycle is relatively small, the abnormality determination threshold may be reduced and the evaluation value incremented with respect to the value of the abnormality count G1 may increase. Thus, it can be immediately determined that the state of overcurrent occurs based on the occurrence of the abnormal condition. On the other hand, when the duty cycle is relatively large, the driving current becomes relatively large, and the state of overcurrent easily occurs due to the overload. Therefore, when the duty cycle is relatively large, the abnormality determination threshold may be increased and the evaluation value incremented with respect to the value of the abnormality count G1 may be reduced. Thus, influence due to fluctuations in load can be avoided, and a false determination of the abnormal condition can be prevented when the overload application begins.

The motor driven by the motor drive control device of the present embodiment is not limited to a brushless motor, and may be another type of motor.

The number of phases of the motor is not limited to three phases. In other words, the number of energization patterns is not limited to the above-described number. Only some energization patterns among conceivable energization patterns (a combination of energized phases) may be switched in a predetermined order to drive the motor. In this case, it can be determined whether the abnormal condition occurs each time the energization patterns are sequentially switched in a predetermined order (each time one cycle of switching control is performed).

The rotational speed command signal input to the control circuit unit may be generated inside the motor drive control device.

The rotor position detection method and the rotational speed detection method are not limited to particular methods. The position detection signal of the motor may be acquired using a detector different from the hall element. For example, a hall IC may be used. The number of hall elements is not limited to three, for example. The motor may be driven using one hall element in a so-called one sensor system.

The above-described flowcharts are examples for describing the operation, and are not limited to this operation. The steps shown in each flowchart are specific examples, and are not limited to this flow. For example, the order of steps may be modified, another process may be inserted between each step, and the processes may be performed in parallel.

A part of all of the processes in the above embodiments may be performed by software, or may be performed by a hardware circuit. For example, the control unit is not limited to the microcomputer. The configuration inside the control unit may be processed at least in part by the software.

The above-described embodiment should be considered in all respects to be illustrative and not restrictive. The scope of the present disclosure is indicated by the appended claims rather than the foregoing description, and all changes that fall within the meaning and range equivalent to the claims are intended to be included therein.

What is claimed is:

1. A motor drive control device comprising:
   a motor drive unit having a plurality of switch elements connected to a power supply source and supplying a driving current to a plurality of phase coils of a motor;

a control circuit unit outputting, to the motor drive unit, a drive control signal for operating the plurality of switch elements to sequentially switch energization patterns for the plurality of phase coils; and
a current detecting circuit detecting a voltage value corresponding to a magnitude of the driving current, wherein:
the control circuit unit includes a first determination unit determining whether a state of overcurrent in which a magnitude of the driving current exceeds a predetermined overcurrent threshold occurs based on the voltage value each time an energization pattern is switched, and a second determination unit determining whether driving of the motor is in an abnormal condition based on a determination result of the first determination unit for a plurality of energization patterns,
the control circuit unit repeatedly performs one cycle of switching control for switching the energization patterns of the plurality of phase coils in a predetermined order, and
the second determination unit determines whether the driving of the motor is in the abnormal condition based on the number of times the first determination unit determines the state of overcurrent while the one cycle of switching control is performed.

2. The motor drive control device according to claim 1, wherein
the second determination unit determines whether the driving of the motor is in the abnormal condition based on a determination result of the first determination unit while the one cycle of switching control is performed each time the one cycle of switching control is performed.

3. The motor drive control device according to claim 1, wherein
the second determination unit calculates a new determination value based on an evaluation value based on the determination result of the first determination unit while the one cycle of switching control is performed each time the one cycle of switching control is performed and a determination value is calculated based on a previous evaluation value, and determines whether the driving of the motor is in the abnormal condition based on a result of comparison between the new determination value and a predetermined abnormality determination threshold.

4. The motor drive control device according to claim 3, wherein
the drive control signal includes a PWM (pulse-width modulation) signal, and
the second determination unit changes at least one of the predetermined abnormality determination threshold and the evaluation value based on a duty cycle of the PWM signal.

5. The motor drive control device according to claim 1, wherein
the control circuit unit further includes a drive stop unit performing control for stopping the driving of the motor based on a determination result by the second determination unit.

6. The motor drive control device according to claim 1, wherein
the control circuit unit includes:
an energization switching circuit outputting a signal for switching the energization pattern according to a rotational position of the motor;
an overcurrent detecting circuit receiving a voltage value detected by the current detecting circuit and outputting a signal corresponding to whether the state of overcurrent occurs;
an abnormality detecting circuit outputting a signal corresponding to whether the driving of the motor is in the abnormal condition based on the signal output from the overcurrent detecting circuit; and
a control signal generation circuit outputting the drive control signal based on the signal output from the energization switching circuit and the signal output from the abnormality detecting circuit.

7. A motor drive control method of driving a motor using a motor drive control device including a motor drive unit having a plurality of switch elements connected to a power supply source and supplying a driving current to a plurality of phase coils of the motor, a control circuit unit outputting, to the motor drive unit, a drive control signal for operating the plurality of switch elements to sequentially switch energization patterns for the plurality of phase coils, and a current detecting circuit detecting a voltage value corresponding to a magnitude of the driving current, the method comprising:
a first determination step of determining whether a state of overcurrent where a magnitude of the driving current exceeds a predetermined overcurrent threshold occurs based on the voltage value each time an energization pattern is switched;
repeatedly performing one cycle of switching control for switching the energization patterns of the plurality of phase coils in a predetermined order; and
a second determination step of determining whether driving of the motor is in an abnormal condition based on the number of times the first determination step determines the state of overcurrent while the one cycle of switching control is performed.

8. A motor drive control device comprising:
a motor drive unit having a plurality of switch elements connected to a power supply source and supplying a driving current to a plurality of phase coils of a motor;
a control circuit unit outputting, to the motor drive unit, a drive control signal for operating the plurality of switch elements to sequentially switch energization patterns for the plurality of phase coils; and
a current detecting circuit detecting a voltage value corresponding to a magnitude of the driving current, wherein:
the control circuit unit includes a first determination unit determining whether a state of overcurrent in which a magnitude of the driving current exceeds a predetermined overcurrent threshold occurs based on the voltage value each time an energization pattern is switched, and a second determination unit determining whether driving of the motor is in an abnormal condition based on a determination result of the first determination unit for a plurality of energization patterns,
the control circuit unit repeatedly performs one cycle of switching control for switching the energization patterns of the plurality of phase coils in a predetermined order, and
the second determination unit determines that the driving of the motor is in the abnormal condition when the determination of the state of overcurrent for some energization patterns while one cycle of switching control is performed continuously occurs for a certain period of time.

9. The motor drive control device according to claim 8, wherein
the second determination unit calculates a new determination value based on an evaluation value based on the determination result of the first determination unit while the one cycle of switching control is performed each time the one cycle of switching control is performed and a determination value is calculated based on a previous evaluation value, and determines whether the driving of the motor is in the abnormal condition based on a result of comparison between the new determination value and a predetermined abnormality determination threshold.

10. The motor drive control device according to claim 9, wherein
the drive control signal includes a PWM (pulse-width modulation) signal, and
the second determination unit changes at least one of the predetermined abnormality determination threshold and the evaluation value based on a duty cycle of the PWM signal.

11. The motor drive control device according to claim 8, wherein
the control circuit unit further includes a drive stop unit performing control for stopping the driving of the motor based on a determination result by the second determination unit.

12. The motor drive control device according to claim 8, wherein
the control circuit unit includes:
an energization switching circuit outputting a signal for switching the energization pattern according to a rotational position of the motor;
an overcurrent detecting circuit receiving a voltage value detected by the current detecting circuit and outputting a signal corresponding to whether the state of overcurrent occurs;
an abnormality detecting circuit outputting a signal corresponding to whether the driving of the motor is in the abnormal condition based on the signal output from the overcurrent detecting circuit; and
a control signal generation circuit outputting the drive control signal based on the signal output from the energization switching circuit and the signal output from the abnormality detecting circuit.

* * * * *